March 1, 1949.    F. F. RIEKE    2,463,428
COAXIAL LINE TERMINATION
Filed Dec. 17, 1945
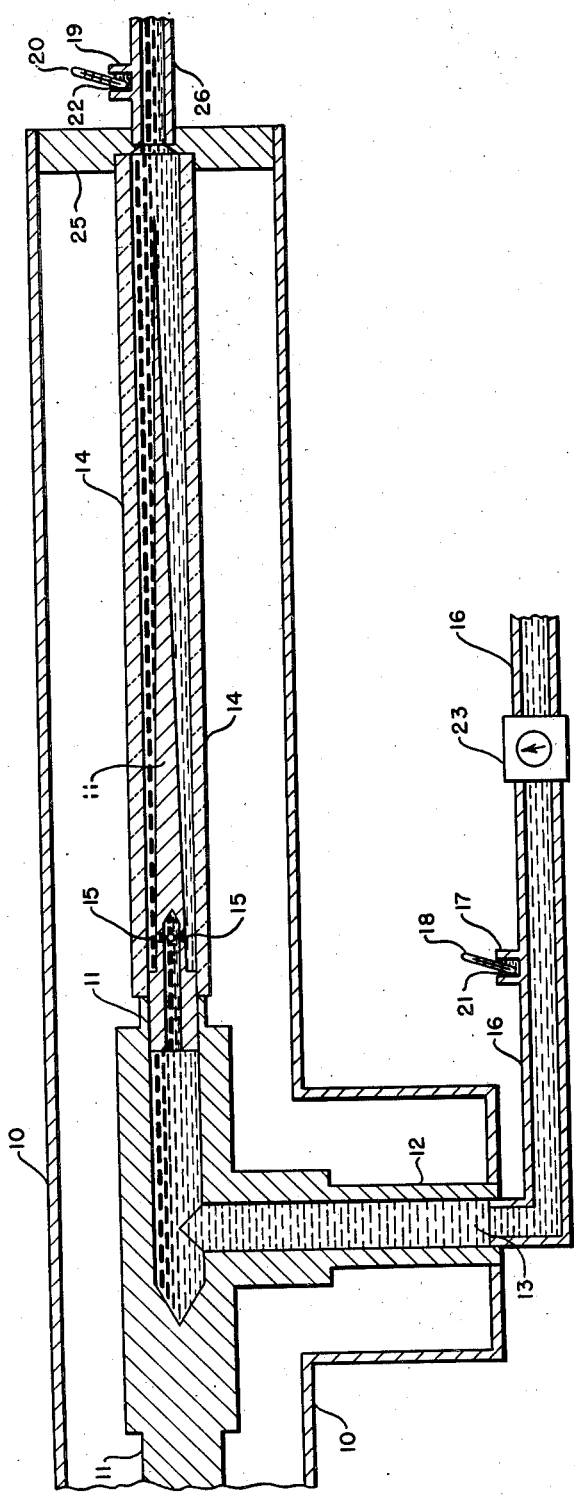
INVENTOR
FOSTER F. RIEKE
BY
*William D. Hall.*
ATTORNEY Patented Mar. 1, 1949

2,463,428

UNITED STATES PATENT OFFICE 2,463,428

COAXIAL LINE TERMINATION

Foster F. Rieke, Belmont, Mass., assignor, by mesne assignments, to the United States of America as represented by the Secretary of War Application December 17, 1945, Serial No. 635,585

1 Claim. (Cl. 178—44)

This invention relates in general to electrical apparatus and more particularly to a means for the absorption and measurement of radio frequency energy.

In making measurements of radio frequency energy, it is desirable to dissipate such energy in the form of heat to prevent it from radiating and causing interference to other radio frequency apparatus. It is also desirable to measure the amount of power being dissipated, thus enabling the efficiency of the apparatus to be determined. A desirable dissipative load is one which produces a low standing wave ratio along the R.-F. line to which it is connected.

It is an object of this invention to provide a novel apparatus for the dissipation of radio frequency energy. It is further an object of this invention to provide a means for measuring the amount of radio frequency energy dissipated.

It is further an object of this invention to provide a novel means for loading a coaxial line to permit dissipation of the R.-F. energy which will make the standing wave ratio of the coaxial line substantially equal to one.

Other objects, features and advantages of this invention will suggest themselves to those skilled in the art and will become apparent from the following description of the invention taken in connection with the accompanying drawing, which is a cross-sectional view of an apparatus embodying the principles of this invention.

Referring now more particularly to the drawing, outer conductor 10 and inner conductor 11 are the normal elements of a coaxial line. Such a line is commonly stub-supported; that is, a short-circuited coaxial stub whose length is one-quarter of the wavelength of the energy to be conducted is used as a support for the inner conductor of the coaxial line. Such a stub, if lossless, presents infinite impedance to the R.-F. energy passing along the line.

It is well known to those skilled in the art that a quarter-wavelength stub support may be broadbanded, that is, may present high impedance to a wide range of frequencies if the dimensions of the inner conductor are enlarged in the proper fashion. The illustrated support 12 is a broadbanded stub support. In this instance the center conductor of the stub 12 is made hollow to afford a passage 13 for the flow of a fluid within the support 12. Following the support 12 a glass tube 14 is constructed to surround conductor 11 and conductor 11 is then tapered, that is, slowly decreased in radius to zero. Immediately following the support 12, conductor 11 is hollow for a distance until the taper of conductor 11 is sufficient to permit fluid to flow through apertures 15 into the glass tube 14. A fluid such as water is passed through passage 13, apertures 15 and tube 14. Outer conductor 10 is terminated by plate 25 through which tube 14 passes. Tube 14 connects to tube 26.

A tube 16 is connected to passage 13 and is constructed to include a thermometer well 17 into which may be inserted a thermometer 18. Similarly, tube 26 is constructed to include a thermometer well 19 into which may be inserted a thermometer 20. Wells 17 and 19 may be filled with fluid, as indicated at 21 and 22 and the construction is such that heat is readily conducted through the walls of tubes 26 and 16 to said wells. A flow meter 23 is inserted in tube 16 to measure the flow of liquid through the tube. Meter 23 may be of any conventional type such as a Venturi or a Pitot tube and may be provided in any suitable position along tube 16 or tube 26.

In operation, radio frequency energy travels inside conductor 10 and along the surface of conductor 11. When conductor 11 is reduced in diameter, a high field concentration is produced. Water or other fluid is made to circulate through tube 14 in this highly concentrated field. Due to the high attenuation constant of water, radio frequency power is dissipated causing the water to heat, thereby raising the temperature of said water. The amount of radio frequency energy flowing within the coaxial line may be measured by knowing the rate of water flow through tube 14 and the temperature increase of the water as indicated by thermometers 18 and 20.

By making the taper of conductor 11 long in relation to the wavelength of radio frequency energy, it is possible to reduce reflections caused by improper termination, thereby producing a low standing wave ratio over a large frequency band.

While there has been described what is at present considered to be the preferred embodiment of this invention, it will be obvious to those skilled in the art that various changes and modifications may be made therein without departing from the scope of the invention.

The invention claimed is:

A terminal portion of a coaxial line, comprising an inner and an outer conductor, the inner conductor comprising a portion tapering to a radius sufficiently small to provide for the dissipation of a substantial amount of power and being long in relation to the wave length employed, a tube surrounding and spaced from the tapered portion of the inner conductor to allow a liquid to surround said tapered portion, and a support for the inner conductor, there being a passageway for fluid through the support and a portion of the inner conductor to the space within said tube surrounding the tapered portion of the inner conductor.

FOSTER F. RIEKE.

REFERENCES CITED

The following references are of record in the file of this patent:

UNITED STATES PATENTS

| Number | Name | Date |
| --- | --- | --- |
| 2,207,845 | Wolff | July 16, 1940 |
| 2,262,134 | Brown | Nov. 11, 1941 |
| 2,382,217 | Fancher | Aug. 14, 1945 |
| 2,387,158 | Kozanowski | Oct. 16, 1945 |
| 2,398,606 | Wang | Apr. 16, 1946 |
| 2,421,758 | Ovrebo | June 10, 1947 |
| 2,438,915 | Hansen | Apr. 6, 1948 |